(12) United States Patent
Nakaigawa et al.

(10) Patent No.: US 7,068,820 B2
(45) Date of Patent: Jun. 27, 2006

(54) IRIS IMAGE PICKUP APPARATUS AND IRIS AUTHENTICATION APPARATUS

(75) Inventors: Tomoyoshi Nakaigawa, Yokohama (JP); Ken Ikoma, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 704 days.

(21) Appl. No.: 10/281,783

(22) Filed: Oct. 28, 2002

(65) Prior Publication Data

US 2003/0081817 A1 May 1, 2003

(30) Foreign Application Priority Data

Oct. 31, 2001 (JP) .............................. 2001-334372

(51) Int. Cl.
*G06K 9/00* (2006.01)
*G04N 7/18* (2006.01)

(52) U.S. Cl. ........................................ 382/118; 348/78
(58) Field of Classification Search ................ 382/115, 382/117–118, 209, 218; 340/5.81, 5.82, 340/5.83; 348/78; 713/186

See application file for complete search history.

(56) References Cited

U.S. PATENT DOCUMENTS 5,901,238 A * 5/1999 Matsushita ................... 382/117
6,247,813 B1 * 6/2001 Kim et al. ................... 351/206
6,289,113 B1 * 9/2001 McHugh et al. ............. 382/117
6,333,988 B1 * 12/2001 Seal et al. ................... 382/117
6,505,193 B1 * 1/2003 Musgrave et al. ............. 707/3
6,549,118 B1 * 4/2003 Seal et al. ................. 340/5.82

FOREIGN PATENT DOCUMENTS

| EP | 1041522 A2 * | 10/2000 |
| JP | 2000-23946 | 1/2000 |
| JP | 2000-083930 | 3/2000 |

OTHER PUBLICATIONS

Negin, et al. "An iris biometric system for public and personal use", IEEE, pp. 2-7, 2000.*

* cited by examiner

*Primary Examiner*—Daniel Miriam
(74) *Attorney, Agent, or Firm*—Pearne & Gordon LLP

(57) ABSTRACT

The iris image pickup apparatus includes a recess sinking in the direction of a sight line of a person to be authenticated, the recess provided on an outer panel covering the image pickup unit for picking up the iris image of a person, indicators arranged at the bottom of the recess, external indicators arranged on the periphery of the recess, and a controller for performing lighting control of the indicator as well as keeping the external indicators off in a period where the image pickup timing of the image pickup unit is overlapped. Since the external indicators are kept off during picking up the image, the sight line of a person to be authenticated does not move to the external indicators thus picking up an iris image without blurs.

7 Claims, 7 Drawing Sheets

FIG. 4

LED INDICATION FLOW

| MODE NO. | OPERATION | LED INDICATION |
|---|---|---|
| 1 | STANBY (READY) | 47m |
| 2 | GUIDING | 45, 46, 47a, 47d |
| 3 | GUIDING (FORWARD) | 47a, 47c, 47d, 47e |
| 3' | GUIDING (BACKWARD) | 47a, 47b, 47d, 47f |
| 4 | PICKING UP FACE IMAGE | 47b |
| 5 | FACE IMAGE PICKUP COMPLETED, START EYE IMAGE PICKUP | 47c |
| 6 | PICKING UP EYE IMAGE | 47d |
| 7 | EYE IMAGE PICKUP COMPLETED, START COMPARISON | 47e |
| 8 | COMPARISON COMPLETED | |

◍ : BLINK
○ : ON
◉ : OFF

OUT OF RANGE IN CASE THE LENGTH
OF EACH OF THREE BAR-SHAPED
INDICATORS DIFFERS FROM EACH OTHER

IRIS IMAGE PICKUP APPARATUS AND IRIS AUTHENTICATION APPARATUS

BACKGROUND OF THE INVENTION

The present invention relates to an iris image pickup apparatus and an iris authentication apparatus for guiding the position of an eye in picking up an iris image used for personal authentication, and in particular to an iris image pickup apparatus and an iris authentication apparatus which can perform high-speed iris authentication by reducing the number of retries of iris image pickup.

FIG. 8A is a front view of a conventional iris authentication apparatus. FIG. 8B is a sectional view of FIG. 8A taken along the line B—B. FIG. 8C is an enlarged view of a sight line guiding unit shown in FIG. 8A at a time of image-pickup of an iris. The iris authentication apparatus is provided with a pickup window 1 for transmitting a near infrared light on its front and an iris image pickup camera (not shown) is arranged on its rear. Near infrared light transmitting windows 2, 3 are arranged on both sides of the pickup window 1. Near infrared light illuminating apparatuses (not shown) are provided behind the near infrared light transmitting windows 2, 3.

A sight line guiding unit for iris image pickup 4 is provided above the pickup window 1. The sight line guiding unit for iris image pickup 4 has an LED group 6 arranged in a predetermined shape on the bottom 5a of a recess 5 surrounded by right/left walls 5L, 5R approximately 1.5 cm in length and upper/lower walls 5U, 5D. In the shown example, the LED group 6 is arranged in the shape of a rectangular frame. The sight line guiding unit for iris image pickup 4 includes, on its periphery, a reporting LED 7 for indicating the progress of iris authentication and an instructing LED 8 for prompting a person to be authenticated to move forward/backward.

When a person to be authenticated stands to the left against the pickup window 1, the person to be authenticated sees the left frame 6L of the rectangular frame of the LED group 6 in a thinner shape than it is actually is, or cannot see the left frame 6L, as obstructed by the left wall 5L. When the person to be authenticated stands to the right against the pickup window 1, the right frame 6R of the rectangular frame is obstructed by the right wall 5R. The person to be authenticated moves to a position where he/she sees the right/left frame 6R, 6L of the rectangular frame without partially or totally hidden, in order to stand facing toward the pickup window 1.

Similarly, when a tall person comes too close to the iris authentication apparatus, the upper frame 6U of the rectangular frame is partially hidden by the upper wall 5U. When a short person comes too close to the iris authentication apparatus, the lower frame 6D of the rectangular frame is partially hidden by the lower wall 5D. Thus the person to be authenticated can make fore-and-aft adjustment. For the fore-and-aft adjustment, in case the image of a person shot is not in a predetermined size, a controller turns on the instructing LED 8 to instruct forward or backward movement of the person to be authenticated, as well as the indicator on the sight line guiding unit for iris image pickup 4.

In case an iris image is shot on the iris authentication apparatus, a reporting LED 7 is turned on to report the progress of authentication in order for the person to be authenticated to recognize that image-pickup is under way. The person to be authenticated watches the indicator to know that image-pickup is under way or image-pickup is completed and authentication is under way.

The sight line guiding unit for iris image pickup 4 mentioned earlier can guide a person to be authenticated to a standing position where an iris image optimum for authentication can be shot. However, when the reporting LED 7 or instructing LED 8 comes on while the person to be authenticated is watching the LED group 6 in the recess 5, the person to be authenticated naturally turns toward the reporting LED 7 or instructing LED 8, thus the position of an eye of the person is dislocated from the initial position. This makes it impossible to pick up an iris image thus requiring retried iris image pickup. Several retries takes tame in authentication of an iris which gives the person to be authenticated an unpleasant feeling.

SUMMARY OF THE INVENTION

The object of the invention is to provide iris image pickup apparatus and iris authentication apparatus which can reduce the number of retries of iris image pickup to boost iris authentication.

An iris image pickup apparatus to attain the object is characterized in that the apparatus comprises image pickup means for shooting the iris of a person to be authenticated, indicator means provided just above the image pickup means for guiding the person to be authenticated to the standing position of the person to be authenticated as well as showing the progress of authentication of the person to be authenticated, and control means for controlling the indicator means. With this configuration, a person to be authenticated knows the progress of authentication without diverting his/her line of sight and a favorable iris image is obtained.

Preferably, the iris image pickup apparatus is characterized in that the indicator means comprises an LED group arranged radially. With this configuration, it is possible to show the progress of authentication by using radial indicator means in clockwise or counterclockwise direction thus allowing intuitive reporting of the progress.

Preferably, the iris image pickup apparatus is characterized in that the indicator means is arranged at the bottom of a recess sinking in the direction of the line of sight of the person to be authenticated. With this configuration, indicator means on the bottom is hidden by way of the walls around the recess when the person to be authenticated is dislocated from the optimum position. It is thus possible to guide the person to be authenticated to the optimum position.

Preferably, the iris image pickup apparatus is characterized in that the indicator means comprises right/left bar-shaped indicator sections respectively provided in a position adjacent the right/left walls which form the recess and a central bar-shaped indicator section provided in the center of the right/left bar-shaped indicator sections. With this configuration, a person to be authenticated can correct his/her position toward the center by recognizing that the right/left bar-shaped indicator sections are hidden by the right/left walls.

Preferably, the iris image pickup apparatus is characterized in that the length of each of the right/left bar-shaped indicator sections is equal to that of the central bar-shaped indicator section. With this configuration, a person to be authenticated knowing that the three bar-shaped indicator sections are equal in length easily finds that his/her position is wrong when he/she recognizes that the length is unequal between these indicator sections with a bar-shaped indicator section hidden by a wall around the recess.

Preferably, the iris image pickup apparatus is characterized in that the length of the central bar-shaped indicator section is longer than that of each of the right/left bar-shaped indicator sections. With this configuration, a person to be authenticated knowing that the length of the central bar-shaped indicator section is longer than that of the right/left bar-shaped indicator sections easily finds that his/her position is wrong when he/she recognizes that the length is equal between these indicator sections with a bar-shaped indicator section hidden by an upper/lower wall.

Preferably, the iris image pickup apparatus is characterized in that concave sections aligned with the central bar-shaped indicator section are engraved on the upper/lower walls forming the recess. With this configuration, in case the position of a person to be authenticated is too close to the sight line guiding unit for iris image pickup, the length of the central bar-shaped indicator section exceeds the length of the right/left bar-shaped indicator section. Thus the person to be authenticated easily finds that his/her position is wrong.

An iris authentication apparatus to attain the object is characterized in that the apparatus comprises iris image pickup apparatus of the aforementioned configuration. With this configuration, the time when a person to be authenticated waits for completion of authentication is shortened thus reducing the workload on the person to be authenticated.

BRIEF DESCRIPTION OF THE DRAWINGS

FIG. 4 is an indication transition diagram of the sight line guiding unit for iris image pickup 40 according to the first embodiment of the invention;

DETAILED DESCRIPTION OF THE PREFERRED EMBODIMENT

Preferred embodiments of the invention will be described referring to drawings.

Figure 2:
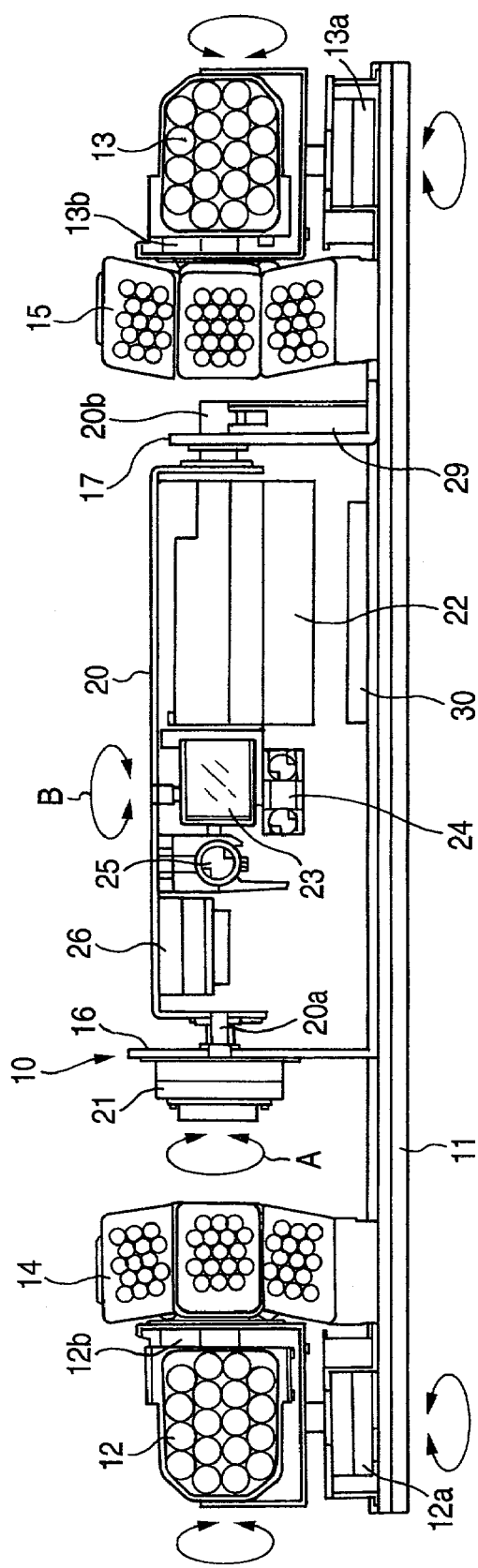
FIG. 2 is a front view of iris authentication apparatus according to an embodiment of the invention.

FIG. 2 is a front view of iris authentication apparatus according to the present invention. Iris authentication apparatus 10 according to the present invention includes a longitudinal fixed table 11. Iris lighting fixtures 12, 13 are attached on the left and right ends of the longitudinal fixed table 11. Each iris lighting fixture 12, 13 includes a condensing lens for condensing and irradiating a near infrared light onto an iris and pan motors for lighting 12a, 13a and tilt motors for lighting 12b, 13b in order to orient the illuminating light in the direction of the iris.

Lighting fixtures for wide angle cameras 14, 15 are attached on the fixed table 11 in the inner direction of each iris lighting fixture (at the center direction of the fixed table 11). The lighting fixtures 14, 15 are also configured as an aggregation of a large number of light emitting diodes. The lighting fixtures 14, 15 are secured to the fixed table and no condensing lenses are provided, because they have only to illuminate a wide range evenly with a near infrared light (no panning or tilt operation is required).

A support plate 16 is elected on the fixed table 11 in the inner direction of the lighting fixture 14 (in the center direction of the fixed table 11). A support plate 17 is elected on the fixed table 11 in the inner direction of the lighting fixture 15 (in the center direction of the fixed table 11). A tilt table 20 is attached between both support plates 16, 17.

The tilt table 20 includes axes 20a, 20b on the left and right respectively. Each axis 20a, 20b is respectively supported rotatably on the support plates 16, 17. One axis 20a is directly coupled to the rotation axis of the motor for tilt 21 attached to the support plate 16. The tilt table 20 is driven to rotate in the direction of an arrow A. A damper 29 is attached to the other axis 20b.

The tilt table 20 includes a telephotographic camera (narrow angle camera) 22, a mirror for panning 23, a range finder (range sensor) 24, a wide angle camera 25, and a motor for panning 26. A telephotographic camera 22 is arranged on the support plate 17 of the tilt table 20 so that the light axis may be coaxial with the rotation axis of the tilt table 20. The mirror for panning 23 is arranged in front of the telephotographic camera 22. A light reflected on the mirror for panning 23 impinges on the telephotographic camera 22. The mirror for panning 23 is rotatable about the axis perpendicular to the light axis of the telephotographic camera 22, that is, in the direction of an arrow B.

The motor for panning 26 for rotating the mirror for panning 23 in the direction of the arrow B is attached to the support plate 16 of the tilt table 20 and drives the mirror for panning 23 to rotate via the link mechanism 27. The range finder 24, interlocked with the mirror for panning 23, is driven in the direction of the arrow B and irradiates an infrared light onto an object face to face thus allowing high-accuracy ranging. The range finder 24 is also driven to rotate by the motor for panning 26 via the link mechanism.

The wide angle camera 25 is arranged between the mirror for panning 23 and the motor for panning 26 and its light axis is provided at an intersection with the rotation axis of the tilt table 20. This eliminates the vertical parallax between the wide angle camera 25 and the telephotographic camera 22.

A controller 30 is arranged on the fixed table 11. The controller 30 controls the operation of the light-emitting diodes of the iris lighting fixtures 12, 13, pan motors for lighting 12a, 13a, tilt motors for lighting 12b, 13b, light-emitting diodes of the lighting fixtures for wide angle cameras 14, 15, motor for tilt 21 of the tilt table 20, motor for panning 26, wide angle camera 25, telephotographic camera 22, and range finder 24, as well as performs lighting control of the LEDs on the sight line guiding unit mentioned later. The controller 30 compares an iris image shot by a telephotographic camera with the dictionary data (iris image data of registered persons) acquired from an iris image database (not shown) for authentication.

Embodiment 1

Figure 1:
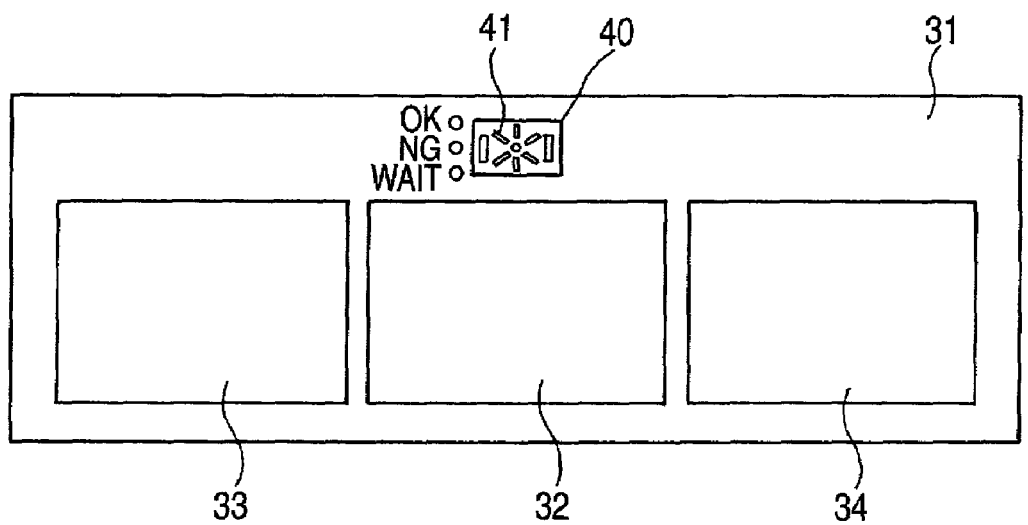
FIG. 1 is a front view of an outer panel to cover iris authentication apparatus according to an embodiment of the invention.

FIG. 1 is a front view of an outer panel to cover the iris authentication apparatus described referring to FIG. 2. On the outer panel 31, in the center front thereof, a pickup window 32 transmitting a near infrared light and cutting off a visible light is provided. On the right and left of the pickup window 32, windows for lighting 33, 34 which transmits a near infrared light are provided. An illuminating light from the right/left lighting fixtures for wide angle cameras 14, 15 or iris lighting fixtures 12, 13 illuminates the face and iris of a person to be authenticated through the windows 33, 34. The reflected light (near infrared light) of the illuminating light impinges on the pickup lens of the wide angle camera 25 through the pickup window 32 and is reflected on the mirror for panning 23 then impinges on the pickup lens of the telephotographic camera 22.

Figure 3:
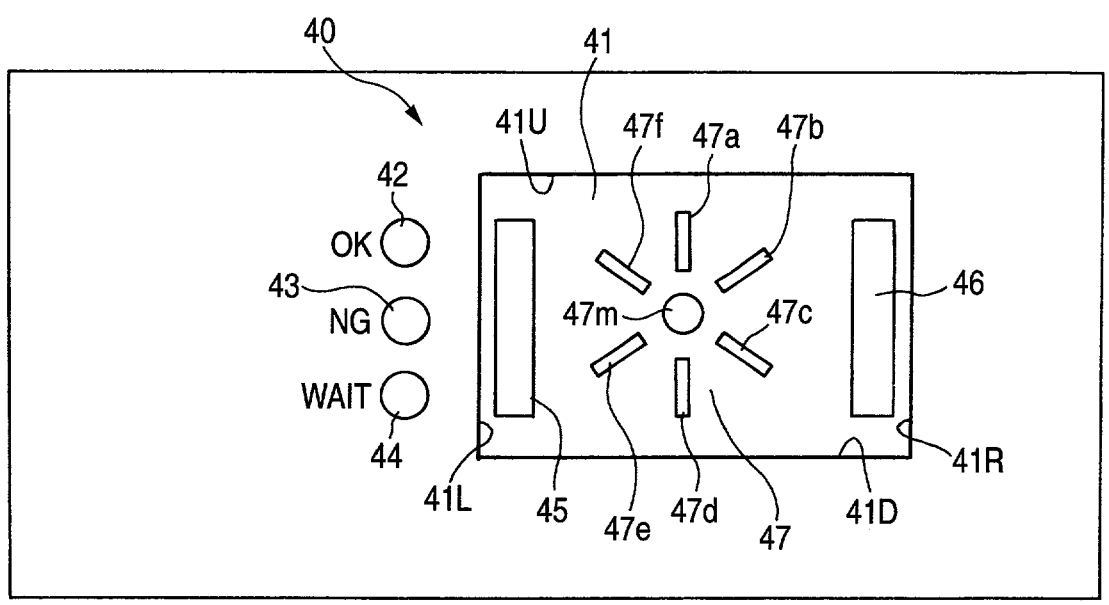
FIG. 3 is an enlarged view of a sight line guiding unit for iris image pickup according to the first embodiment of the invention.
Figure 5:
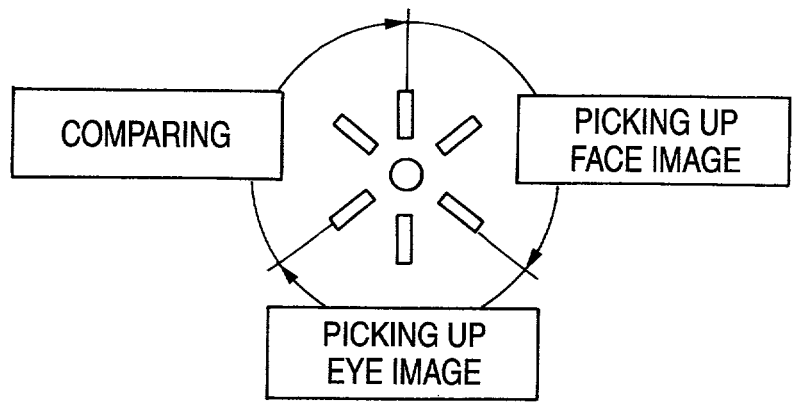
FIG. 5 explains the progress of authentication in the first embodiment of the invention.

Substantially above the pickup window 32, a sight line guiding unit for iris image pickup 40, according to the first embodiment of the invention, is provided. The sight line guiding unit for iris image pickup 40 includes a rectangular recess 41 provided on the outer panel 31 and three LEDs for decision 42, 43, 44 arranged on the left to the recess 41 as shown in FIG. 3. By providing the sight line guiding unit for iris image pickup 40 substantially above the pickup window 32, it is possible to pick up the iris image of a person to be authenticated without the iris hidden by eyelashes.

The LED for decision 42 indicates "OK" meaning that the authentication result of a person to be authenticated has coincided with the iris of a registered person (person authorized to enter the room). The LED for decision 43 indicates "NG" meaning that the authentication result of a person to be authenticated has not coincided with the iris of a registered person. The LED 44 indicates "Wait" meaning that authentication is under way through another camera in the system. These LED indicators for decision reports information not overlapping the timing of iris image pickup to a person to be authenticated. These LEDs are not illuminated in a time zone when the face or iris of a person to be authenticated is shot.

FIG. 3 is an enlarged view of an LED group provided on the bottom of the recess 41 of the sight line guiding unit for iris image pickup 40. Individual LEDs are not shown. In this embodiment, a left vertical bar LED group (bar-shaped indicator) 45 arranged in the shape of a vertical bar close to the left wall 41L forming the recess 41, a right vertical bar LED group (bar-shaped indicator) 46 arranged in the shape of a vertical bar close to the right wall 41R forming the recess 41, and a radial LED group 47 arranged radially in the center between the left vertical bar LED group 45 and a right vertical bar LED group 46.

The radial LED group 47 includes an LED 47m arranged in the center and six LED groups 47a, 47b, 47c, 47d, 47e, 47f arranged radially about the LED 47m. The LED group 47a and the LED group 47d are provided in parallel with the right/left vertical bar LED groups 45, 46 and altogether constitute a bar-shaped indicator section. The length from the upper end of the LED group 47a to the lower end of the LED group 47d is equal to the length from the upper end to the lower end of the LED group 45, 46.

The LEDs constituting the sight line guiding unit for iris image pickup 40 of the aforementioned configuration are connected to the controller 30 shown in FIG. 2. Lighting, shut-off and blinking of the LEDs are controlled by the controller 30. The decision LEDs 42, 43, 44 are also connected to the controller 30. Lighting of the LEDs 42, 43, 44 is controlled by the controller 30.

FIG. 4 is an LED lighting state transition diagram of sight line guiding unit for iris image pickup 40 according to this embodiment. For example, the iris authentication apparatus in FIG. 1 is provided at the entrance of a room where only an authorized person is allowed to enter. A person wishing to enter the room stands before the iris authentication apparatus.

Indication in Mode 1 shown in FIG. 4, or a state where the central 47m alone is turned on and the other LEDs are turned off, shows a standby state. An infrared light is irradiated in the front direction from the range finder 24 shown in FIG. 1. When the range finder 24 detects a reflected light, the controller 30 recognizes that a person to be authenticated is in front and makes a transition to the indication of Mode 2.

Figure 8A:
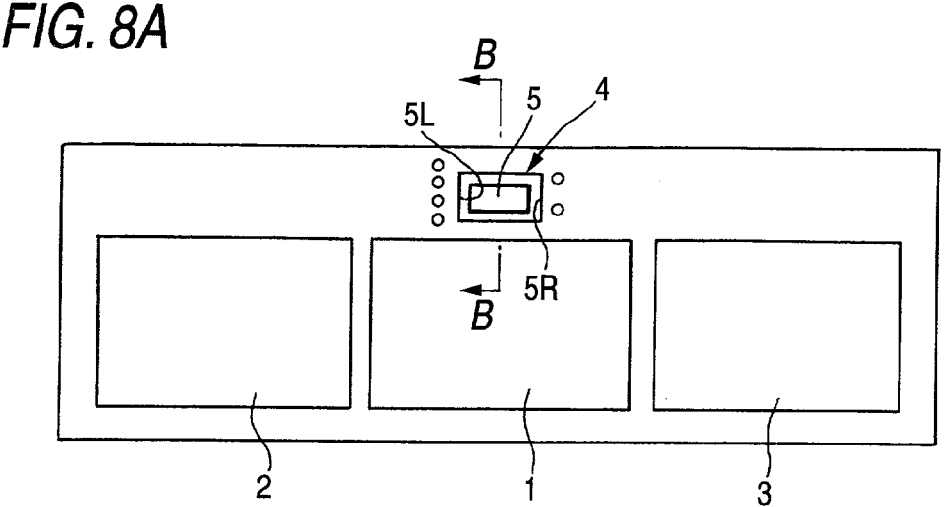
FIGS. 8A to 8C explain a conventional sight line guiding unit for iris image pickup.
Figure 8B:
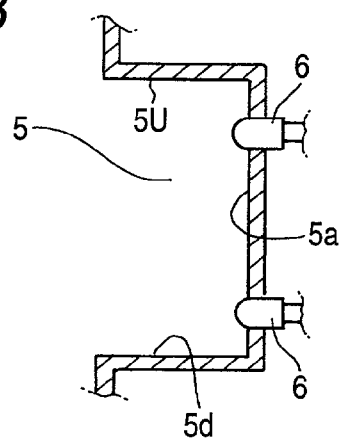
Figure 8C:
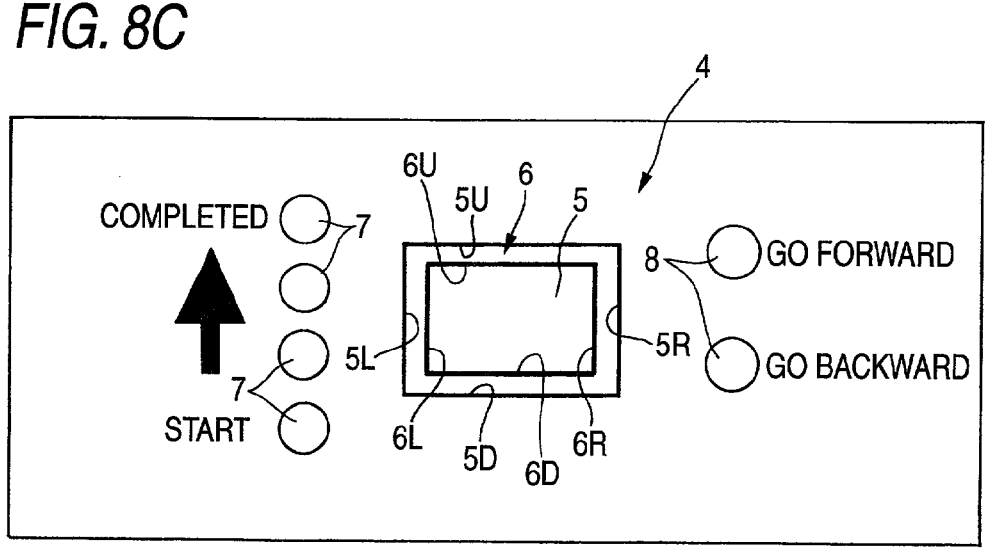

In Mode 2, the right/left bar LED groups 45, 46, the central LED 47m, and the upper/lower radial LED groups 47a, 47b are turned on. A person to be authenticated, watching the LED groups thus lit, chooses to stand in a position where the width of the right/left bar LED group 45, 46 looks the same. Thus the person to be authenticated is right in front of the pickup window 32. The person to be authenticated can see the upper/lower radial LED groups 47a, 47b in the center so that it is easier to check the center position than the conventional unit shown in FIG. 8.

The person to be authenticated stands in the optimum position in the fore-and-aft direction when he/she stands in a position where he/she sees the three vertical bars (right/left LED groups 45, 46 and central LED groups 47a, 47d) in the center of the recess 41 without upper/lower ends of the bars hidden. The controller 30, in case it has determined that an image of a person is not shot within the size of a predetermined range by the wide angle camera, instructs the person to be authenticated to move forward or backward so that the image of the person will be a size within the predetermined range.

Mode 3 shows an instruction to move forward. In the shown example, an upward arrow is indicated. That is, the central LED 47m, LED groups 47c, 47d, 47e are turned on and the LED group 47a corresponding to the tip of the arrow is blinking.

Mode 3' shows an instruction to move backward. In the shown example, a downward arrow is indicated. That is, the central LED 47m, LED groups 47a, 47b, 47f are turned on and the LED group 47d corresponding to the tip of the arrow is blinking. Modes 3 and 3' are used only when necessary. Otherwise, execution makes a transition to Mode 4.

In Mode 4 or subsequent modes, the progress of iris authentication is shown using the radial LED groups 47a, 47b, 47c, 47d, 47e, 47f. In this embodiment, the progress of iris authentication is shown in three stages, "picking up a face image," "picking up an eye image," and "comparing."

In Mode 4, "picking up a face image" is reported by turning on the central LED 47m and the radial LED group 47a and causing the LED group 47b to blink. While this reporting is under way, the controller 30 turns on the lighting fixture for wide angle cameras 14 or 15 and uses the wide angle camera 25 to take the face picture of a person to be authenticated.

When the face picture is shot, execution makes a transition to Mode 5. The LED group 47b blinking in Mode 4 is now lit and the next LED group 47c is blinking. Mode 5 means the end of face image-pickup and start of eye image-pickup. Based on Mode 5, the controller 30 uses the pattern matching technique to obtain the position of the right eye of the person to be authenticated from the face image, calculate the coordinates of the right eye obtained, orient the illuminating direction of the iris lighting fixture 12 or 13 toward the coordinates of the eye position, adjust the orientation of the motor for tilt 21 and the mirror for panning 23 then orient the image-pickup direction of the telephotographic camera 22 toward the coordinates of the eye position.

In Mode 6, the LED group 47*c* blinking in Mode 5 is now lit and the next LED group 47*d* is blinking. Mode 6 means that an eye image is being shot. Based on Mode 6, the controller 30 uses the telephotographic camera 22 to pick up an enlarged image of the right eye.

When the enlarged image of the right eye is shot, execution makes a transition to Mode 7. In Mode 7, the LED group 47*d* blinking in Mode 6 is now lit and the next LED 47*e* is blinking. Mode 7 means the end of pickup of the enlarged image of the right eye and start of authentication (comparison).

Based on Mode 7, the controller 30 cuts out an iris image from the enlarged image of the right eye shot. Then the controller compares the iris image with the registered iris image of the right eye of each person authorized to enter the room. When this comparison is complete, execution enter Mode 8 which is the same standby state as Mode 1.

In case it has determined that the iris image is blurred and is not appropriate for authentication, the controller 30 executes the auto-focus processing to pick up an iris image again or returns to Mode 4 to start with taking a face picture. In case it has determined that an image of the right eye is not appropriate for authentication, the controller 30 starts with taking a face picture, acquires an iris image of the left eye, then compares the resulting image with registered left eye iris images. The controller does not determine that the person to be authenticated is not a registered person via a single authentication process but repeats the pickup-and-comparison process as many as the preset number of retries, until it finally determines that the iris image does not pass the authentication and turns on the LED 43.

It is possible to reduce the wait time of a person to be authenticated by reducing the number of retries thus reducing the number of image-pickup times until the person to be authenticated is determined as a registered person and the LED 42 is turned on. In this embodiment, the LEDs 42, 43, 44 provided outside the recess 41 are not lit and the LED groups in the recess 41 alone are lit from the start of image-pickup to the end of authentication of image-pickup. Thus it is possible to fix the sight line of the person to be authenticated within the recess 41. This shortens the time to determination of the person to be authenticated as a registered person thus reducing the workload of the person to be authenticated.

Embodiment 2

Figure 6A:
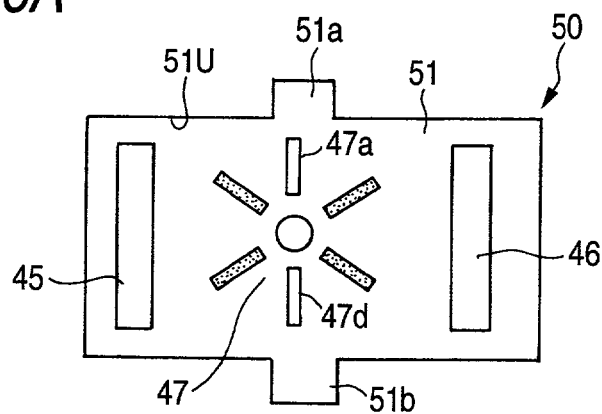
FIGS. 6A and 6B explain the sight line guiding unit for iris image pickup according to the second embodiment of the invention.

FIG. 6A is a front view of sight line guiding unit for iris image pickup 50 according to the second embodiment of the invention. The sight line guiding unit for iris image pickup 50 differs from the sight line guiding unit for iris image pickup 40 according to the first embodiment in that concave sections 51*a*, 51*b* are provided in the center of each of the upper wall 51U and the lower wall 51D among the walls forming the recess 51. The concave sections 51*a*, 51*b* are provided to align with the radial LED groups 47*a*, 47*d*.

Figure 6B:
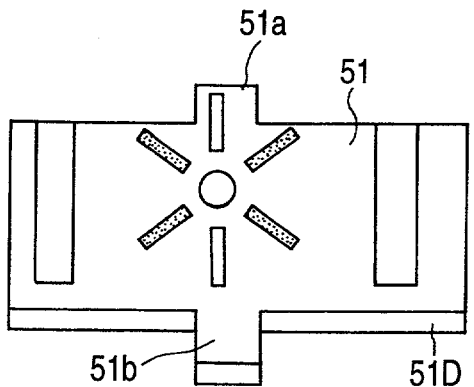

With this configuration, when a tall person to be authenticated comes too close to the sight line guiding unit for iris image pickup 50, the upper end of each of the right/left bar LED groups 45, 46 is hidden by the upper wall 51U as shown in FIG. 6B. On the other hand, the central radial LED group 47*a* is seen in its entirety because the concave section 51 is provided. The person to be authenticated finds that the length of the LED group 45, 46 is not equal to the length from the upper end of the LED group 47*a* to the lower end of the LED group 47*d*. Thus the person to be authenticated easily knows that he/she is too close to the iris authentication apparatus.

Embodiment 3

Figure 7A:
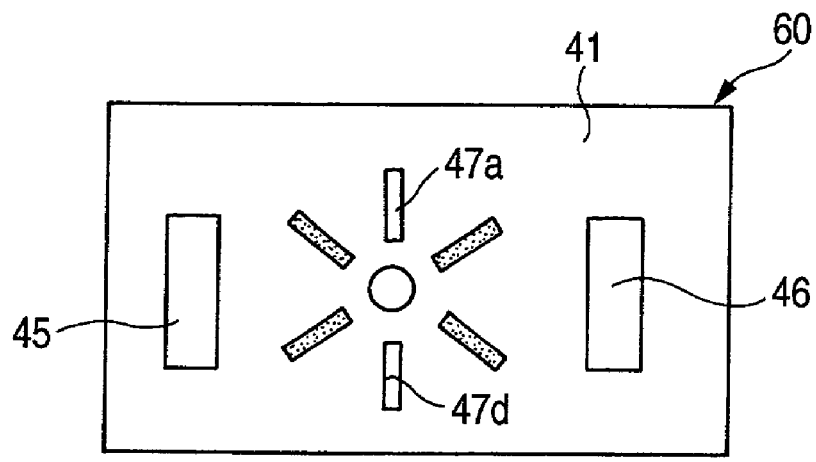
FIGS. 7A and 7B explain the sight line guiding unit for iris image pickup according to the third embodiment of the invention.

FIG. 7A is a front view of sight line guiding unit for iris image pickup 60 according to the third embodiment of the invention. The sight line guiding unit for iris image pickup 60 differs from the sight line guiding unit for iris image pickup 40 according to the first embodiment in that the length from the upper end of the LED group 47*a* to the lower end of the LED group 47*d* is longer than the length of the right/left LED group 45, 46.

Figure 7B:
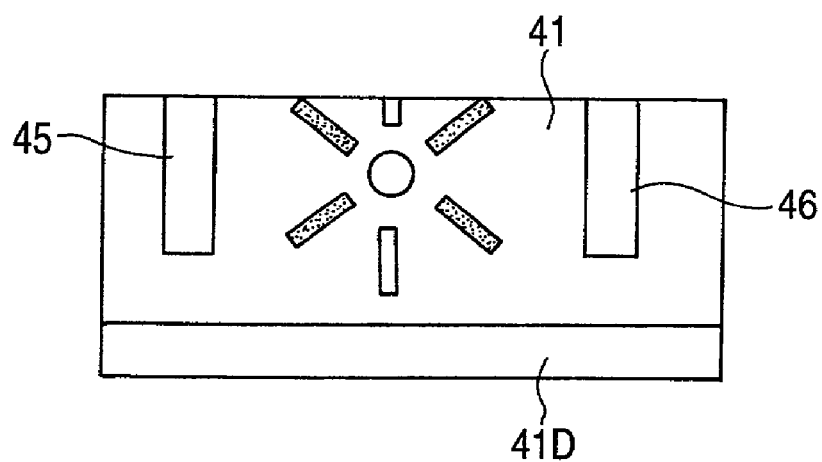

In case a tall person to be authenticated knowing the difference in the length in advance comes too close to a sight line guiding unit for iris image pickup, he/she sees the upper end of the central LED group 47*a* and the right/left bar LED group 45, 46 at the same level as shown in FIG. 7B. In this case also, the person to be authenticated easily knows that he/she is too close to the iris authentication apparatus.

While iris authentication apparatus where a controller 30 for performing authentication (comparison) of iris images is integrally mounted on the iris image pickup apparatus for iris images pickup has been taken as an example in the aforementioned embodiments, the embodiments can be applied to iris authentication apparatus where a processor for performing authentication is provided separately from iris image pickup apparatus and where the processor receives iris image data acquired by the iris image pickup apparatus and a processor for authentication performs authentication.

While the LEDs for decision 42, 43, 44 are provided outside the recess 41 in the aforementioned embodiments, states of the LED group 47 maybe used without providing the LEDs for decision 42, 43, 44. In this case, absence of external indicators provides a simpler appearance and fixes the line of sight of a person to be authenticated to the inside of the recess 41, which is a favorable configuration.

According to the invention, it is possible to provide iris image pickup apparatus and iris authentication apparatus which can fix the line of sight of a person to be authenticated while the iris image of the person to be authenticated is being shot and which can reduce the iris image pickup times to shorten the processing time to completion of authentication.

What is claimed is:

1. An iris image pickup apparatus comprising:
   an image pickup unit for picking up the iris image of a person;
   an indicator unit provided substantially above said image pickup unit, wherein the indicator unit is configured to guide the person to an appropriate standing position and to indicate the progress of authentication of the person, and wherein the indicator unit comprises a plurality of LED groups respectively arranged radially; and
   a controller for controlling the indicator unit.

2. An iris authentication apparatus comprising an iris image pickup apparatus as claimed in claim 1.

3. An iris image pickup apparatus comprising:
   an image pickup unit for picking up the iris image of a person;
   an indicator unit provided substantially above said image pickup unit, wherein the indicator unit is configured to guide the person to an appropriate standing position and to indicate the progress of authentication of the person;

a recess portion provided substantially above said image pick up unit, wherein said indicator unit is arranged at a bottom of said recess portion sinking in the direction of the line of sight of the person to be authenticated; and a controller for controlling the indicator unit.

4. The iris image pickup apparatus as claimed in claim 3, wherein said indicator unit comprises:

right/left bar indicators respectively provided in a position adjacent the right/left walls of the recess portion; and a central bar indicator provided in the center of said right/left bar indicators.

5. The iris image pickup apparatus as claimed in claim 4, wherein a length of each of said right/left bar indicators is equal to a length of said central bar indicator.

6. The iris image pickup apparatus as claimed in claim 4, wherein a length of said central bar indicator is longer than a length of each of the right/left bar-shaped indicators.

7. The iris image pickup apparatus as claimed in claim 5, wherein concave sections are provided on an extension of said bar indicator of upper and lower walls of said recess.

* * * * *